United States Patent Office 3,752,827
Patented Aug. 14, 1973

3,752,827
DIELS-ALDER ADDUCTS OF BIS(TRIFLUORO-METHYL)THIOKETENE
Maynard Stanley Raasch, Wilmington, Del., assignor to E. I. du Pont de Nemours and Company, Wilmington, Del.
No Drawing. Continuation-in-part of abandoned application Ser. No. 31,392, Apr. 23, 1970. This application Mar. 16, 1971, Ser. No. 124,989
Int. Cl. C07d 65/04
U.S. Cl. 260—327 TH                         10 Claims

ABSTRACT OF THE DISCLOSURE

Diels-Alder reaction of bis(trifluoromethyl)thioketene with conjugated cyclic dienes results in hexafluoroisopropylidenedihydrothiopyrans. These compounds, and certain derivatives thereof, have anti-inflammatory properties.

CROSS REFERENCE TO RELATED APPLICATIONS

This application is a continuation-in-part of my copending application Ser. No. 31,392, filed April 23, 1970, abandoned.

BACKGROUND OF THE INVENTION

Field of the invention

This invention relates to novel hexafluoroisopropylidenedihydrothiopyrans and certain of their derivatives, and their use as anti-inflammatory agents.

Bis(trifluoromethyl)thioketene has been reported in Chem. Commun. 577 (1966) and shown to undergo a Diels-Alder reaction with 2,3-dimethylbutadiene. This ketene is described in U.S. Pat. 3,275,609 and has been further shown in U.S. Pat. 3,406,184 to react with an isolated double bond of a diethylenically unsaturated polycyclic hydrocarbon. There is no teaching in the art as to reaction of this thioketene with a cyclic diene having conjugated unsaturation nor the use of the reaction product as an anti-inflammatory agent.

DESCRIPTION OF THE INVENTION

It has now been found that compounds having a hexafluoroisopropylidene substituent adjacent to sulfur of a reduced thiopyran ring system are anti-inflammatory agents. These novel anti-inflammatory compounds are obtained by the Diels-Alder reaction between a conjugated cyclic diene and bis(trifluoromethyl)thioketene. Oxidation, reduction and halogen addition products obtained therefrom are also anti-inflammatory agents.

The invention comprises an anti-inflammatory compound of the formula:

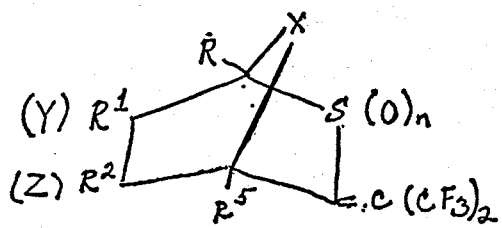

wherein $n$ is 0, 1 or 2;
Y and Z each represent H or together represent a carbon-carbon bond;
R and $R^5$, alike or different, are H, alkyl or alkoxy of up to 4 carobn atoms, or cycloalkyl of up to 6 carbon atoms;

$R^1$ and $R^2$, alike or different, are H, alkyl of up to 4 carbon atoms, cycloalkyl of up to 6 carbon atoms, or halogen, i.e. F, Cl, Br or I;
X is a bridging means consisting of divalent radicals of the formulas

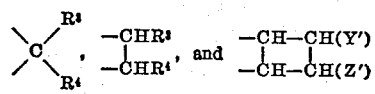

wherein $R^3$ and $R^4$, alike or different, are H, alkyl or alkenyl of up to 4 carbons, cycloalkyl of 5–6 carbons, alkoxy of up to 6 carbons, Cl, or Br, with the proviso that only one of $R^3$ and $R^4$ is Cl or Br; and when joined together, alkylene of 2–6 chain carbon atoms, e.g. ethylene and hexamethylene, or a trimethylenedioxy; and
Y' and Z' each represent H or together represent a carbon-carbon bond.

The total carbons of R, $R^1$, $R^2$, $R^3$, $R^4$ and $R^5$ is generally no more than 18 and preferably less than 6. The preferred halogens are fluorine and chlorine.

The invention also comprises an effective anti-inflammatory amount of a compound of the invention in a nontoxic pharmaceutical carrier.

The reaction to obtain the compounds of the invention is represented as follows:

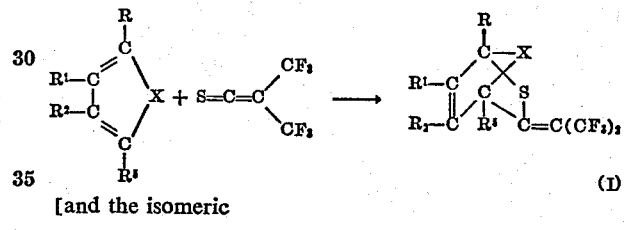

[and the isomeric

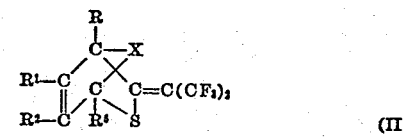

when the $R^1$ and $R^2$ (or the $R^1$ and $R^5$ groups) are different] wherein R, $R^1$, $R^2$, $R^5$ and X are as defined above.

By reduction the double bond in Formula I or II is converted to a single bond. By halogenation, fluorine, chlorine, bromine, or iodine is introduced on the carbons to which $R^1$ and $R^2$ groups are attached. The nuclear sulfur can be oxidized to the sulfoxide and the sulfone by appropriate oxidizing agents.

Compounds of the structure I will be obtained when the sulfur atom of the ketene reactant attaches to the number 1 carbon of an unsymmetrical diene and compounds of the structure II will be formed when the sulfur atom attaches to the number 4 carbon of an unsymmetrical diene. The formation of the two types of bridged compounds I and II illustrates the fact that if the cyclic diene is unsymmetrical, two isomeric products are possible and will generally be formed.

The Diels-Alder reaction may be carried out in the presence or absence of a solvent, the choice depending on the reactivity and physical state of the cyclic, conjugated diene. Very reactive dienes are conveniently diluted to control the reaction and facilitate heat removal. In the case of solid dienes it is usually appropriate to dissolve the diene in any inert solvent. Suitable solvents include dichloromethane, chloroform, carbon tetrachloride, 1,2-difluorotetrafluoroethane, pentane, hexane, heptane, octane, benzene chlorobenzene, and carbon disulfide. The reaction is conveniently carried out at 0–100° C., the lower temperatures being suitable for reactive dienes such as cyclopentadiene whereas with less reactive dienes an elevated temperature may be required. For reactions run above the boiling point (52° C.) of the thioketene, a closed reaction vessel is used. Purification of the products may be carried out by conventional procedures, such as recrystallization, distillation, and the various types of chromatography.

SPECIFIC EMBODIMENTS OF THE INVENTION

The following examples are non-limitative examples in which all parts are as stated.

Example 1.—Cyclopentadiene adduct $R=R^1=R^2=R^5=H$;
$n=0$; $a=$double bond;
$X=>CH_2$

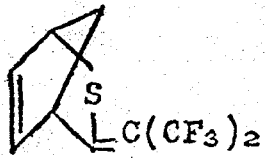

To 2.64 g. (0.04 mol) of freshly prepared cyclopentadiene dissolved in 10 ml. of dichloromethane was slowly added with stirring 7.76 g. (0.04 mol) of bis(trifluoromethyl)thioketene in 10 ml. of dichloromethane. The temperature was kept at 25° C. or less by cooling in ice. Distillation gave 9.3 g. (89% yield) of 3-[2,2,2-trifluoro-1-(trifluoromethyl)ethylidene] - 2 - thiabicyclo[2.2.1]hept-5-ene, B.P. 69° (7 mm.), $n_D^{25}$ 1.4486; IR 3077 cm.$^{-1}$ (=CH), 1616 (exocyclic C=C), 1575 (ring C=C); $^{19}$F NMR (neat) −7.65, −11.6 p.p.m. (quadruplets), using $CCl_2FCCl_2F$ as standard.

Analysis.—Calcd. for $C_9H_6F_6S$ (percent): C, 41.55; H, 2.32; S, 12.32. Found (percent): C, 41.45; H, 2.37; S, 12.22.

Example 2.—1,3-cyclohexadiene adduct $R=R^1=R^2=R^5=H$;
$n=0$;
$a=$double bond;

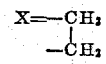

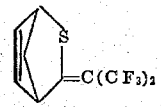

Bis(trifluoromethyl)thioketene was added to an equimolar amount of 1,3-cyclohexadiene with cooling in ice and the mixture was allowed to stand for 16 hr. Fractionation yielded 3-[2,2,2-trifluoro-1-(trifluoromethyl)ethylidene]-2-thiabicyclo[2.2.2]oct - 5 - ene, B.P. 79–80° (1.4 mm.), $n_D^{25}$ 1.4596; IR 1570 cm.$^{-1}$ (C=C); $^1$H NMR 1.6–2.4 p.p.m. (m, 4H), 4.00, 4.43 (broad doublets, 1H each), 6.32, 6.80 (triplets, CH=CH); $^{19}$F NMR −10.4, −14.1 p.p.m. (quadruplets).

Analysis.—Calcd. for $C_{10}H_8F_6S$ (percent): C, 43.80; H, 2.94; S, 11.69. Found (percent): C, 43.65; H, 2.95; S, 11.84.

Example 3.—Cyclooctatetraene adduct $R=R^1=R^2=R^5=H$; $n=0$
$a=$double bond;

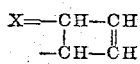

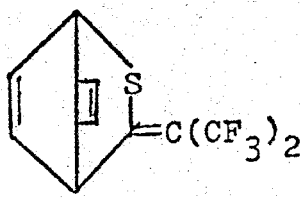

Cyclooctatetraene (3.12 g., 0.03 mol) and 5.82 g. (0.03 mol) of the thioketene were sealed in a glass tube and heated at 100° for 16 hr. Recrystallization of the product from methanol gave 7.0 g. (78%) of 4-[2,2,2-trifluoro-1-(trifluoromethyl)ethylidene] - 3 - thiatricyclo [4.2.2.0$^{2,5}$]deca-7,9-diene in 3 crops, M.P. 49–50°; IR 3067 cm.$^{-1}$ (=CH), 1575 (exocyclic C=C); $^1$H NMR (CCl$_4$) 2.85, 3.20 p.p.m. (triplets, 6-membered ring bridgehead protons), 3.9, 4.4 (broad multiplets, saturated cyclobutene protons), 6.07 (sharp peak, cyclobutene CH=CH), superimposed on this is a broader absorption corresponding to another =CH, 6.43 (t, equivalent to =CH); $^{19}$F NMR (CCl$_4$) −10.3, −13.8 p.p.m. (quadruplets).

Analysis.—Calcd. for $C_{12}H_8F_6S$ (percent): C, 48.23; H, 2.70; S, 10.75. Found (percent): C, 48.16; H, 2.98; S, 10.62.

Example 4.—Spiro[2,4]hepta-4,6-diene adduct $R=R^1=R^2=R^5=H$; $n=0$;
$a=$double bond

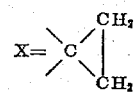

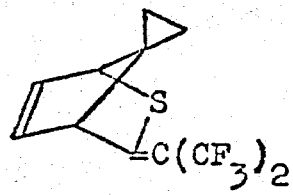

Ten grams (0.0515 mol) of bis(trifluoromethyl)thioketene in 8 ml. of dichloromethane was added to 6.77 g. (0.0735 mol) of spiro[2,4]hepta-4,6-diene [K. Alder, H. J. Ache, and F. H. Flock, Chem. Ber., 93, 1888 (1960)] in 20 ml. of dichloromethane with cooling in ice. Distillation of the product gave 13.4 g. (91%) of 3-[2,2,2 - trifluoro-1 - (trifluoromethyl)ethylidene]spiro-2-thiabicyclo[2.2.1]hept - 5 - ene-7,1'-cyclopropane, B.P. 45° (0.05 mm.), $n_D^{25}$ 1.4591. $^1$H NMR (neat) 0.53 (m, 4H, cyclopropyl), 3.67 (m, 2H, bridgeheads), 6.11, 6.52 (m, CH=CH).

Analysis.—Calcd. for $C_{11}H_8F_6S$ (percent): C, 46.15; H, 2.82; S, 11.20 Found (percent): C, 46.29; H, 2.81; S, 11.00.

Example 5.—1,1,5-trimethylcyclopentadiene adduct

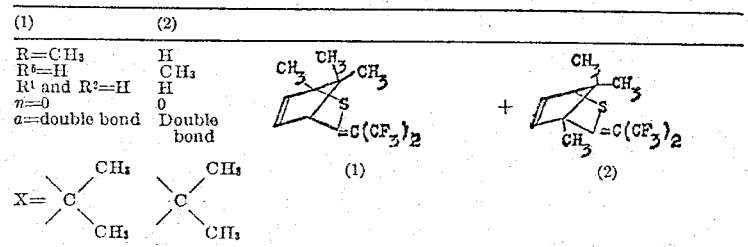

To 10.8 g. (0.1 mol) of 1,5,5-trimethylcyclopentadiene [K. Alder and E. Windemuth, Ann., 543, 28 (1949)] in 25 ml. of dichloromethane was added 19.4 g. (0.1 mol) of bis(trifluoromethyl)thioketene with stirring and cooling in ice. Distillation gave 26.2 g. (87%) of trimethyl-3-[2,2,2-trifluoro-1 - (trifluoromethyl)ethylidene]-2-thiabicyclo[2.2.1]hept-5-ene, B.P. 55° (1.8 mm.), $n_D^{26}$ 1.4460.

*Analysis.*—Calcd. for $C_{12}H_{12}F_6S$ (percent): C, 47.68; H, 4.00; S, 10.61. Found (percent): C, 47.95; H, 3.96; S, 11.00.

Example 6.—Methylcyclopentadiene adduct

One of R, $R^1$, $R^2$, $R^3$, $R^4$ or $R^5$ is $CH_3$ and the remainder are each H;

$n=0$;
$a$=double bond; $X=>CR^3R^4$

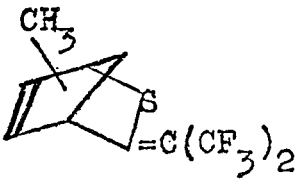

Commercial methylcyclopentadiene dimer was cracked to give an isomeric mixture of methylcyclopentadienes:

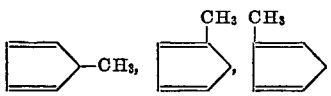

To 12 g. (0.15 mol) of the methylcyclopentadienes in 25 ml. of dichloromethane was added 29.1 g. (0.15 mol) of bis(trifluoromethyl)thioketene in 15 ml. of dichloromethane at 15–20°. Distillation gave 34.8 g. (83%) of an isomeric mixture of methyl-3-[2,2,2-trifluoro-1-(trifluoromethyl)ethylidene] - 2 - thiabicyclo[2.2.1]hept-5-enes, 60–67° (5 mm.), $n_D^{26}$ 1.4419–1.4480, in which the methyl group is in one of the 1, 4, 5, 6 or 7 positions.

*Analysis.*—Calcd. for $C_{10}H_8F_6S$ (percent): C, 43.79; H, 2.94; S, 11.66. Found (percent): C, 43.60; H, 2.78; S, 11.30.

Example 7.—Sulfone of cyclopentadiene adduct $R=R^1=R^2=R^5=H$; $n=2$;
$a$=double bond; $X=>CH_2$

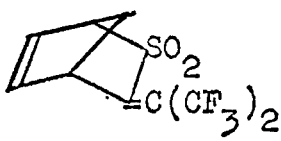

Procedure A.—The compound of Example 1 (26 g., 0.1 mol) was dissolved in 50 ml. of dichloromethane and 43 g. (0.21 mol) of 85% m-chloroperbenzoic acid dissolved in 450 ml. $CH_2Cl_2$ was added with cooling in ice. The solution was allowed to stand for 2 days at 4° and then washed with 5% aqueous sodium hydroxide and dried ($Na_2SO_4$). The residue left after evaporation of the solvent was recrystallized from carbon tetrachloride to give 22.9 g. (78%) of 3-[2,2,2-trifluoro-1-(trifluoromethyl)ethylidene]-2 - thiabicyclo[2.2.1]hept-5-ene 2,2-dioxide, M.P. 82–86°.

Procedure B.—A mixture of 3 g. (0.0115 mol) of the compound of Example 1, 15 ml. of acetic acid, and 3.5 ml. (0.034 mol) of 30% hydrogen peroxide was heated on a steam bath for 2 hr. Excess hydrogen peroxide was destroyed with 5% ruthenium on carbon and solvent was evaporated from the filtered solution. The residue was recrystallized from cyclohexane to give 0.98 g. (29%) of the sulfone, M.P. 82.7–84°; ¹H NMR ($CCl_4$) 2.55 (t, bridge $CH_2$), 3.94, 4.10 (bridgehead protons), 6.35 p.p.m. (t, $CH=CH$).

*Analysis.*—Calcd. for $C_9H_6F_6O_2S$ (percent): C, 37.01; H, 2.07; S, 10.97. Found (percent): C, 37.00; H, 2.53; S, 10.93.

Example 8.—Sulfoxide of cyclopentadiene adduct $R=R^1=R^2=R^5=H$; $n=1$;
$a$=double bond; $X=>CH_2$

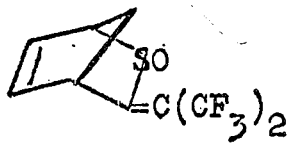

To the compound of Example 1 (26 g., 0.1 mol) dissolved in 50 ml. of dichloromethane was added at 15–20° 20.4 g. (0.1 mol) of 85% m-chloroperbenzoic acid dissolved in 225 ml. of dichloromethane. The solution was then washed with 5% sodium bicarbonate solution and dried ($Na_2SO_4$). The solvent was boiled off, finally under vacuum. The product was recrystallized from methanol by cooling in Dry Ice to give 10.26 g. (38%) of 3-[2,2,2-trifluoro-1-(trifluoromethyl)ethylidene] - 2 - thiabicyclo[2.2.1]hept-5-ene 2-oxide, M.P. 46–49°; ¹H NMR (neat) 2.50 (center of quartet, bridge $CH_2$), 4.12, 4.27 (singlets, bridgeheads), 6.01 (m, $CH=CH$).

*Analysis.*—Calcd. for $C_9H_6F_6OS$ (percent): C, 39.14; H, 2.19; S, 11.61. Found (percent): C, 39.31; H, 1.96; S, 11.58.

Example 9.—Dichloride of cyclopentadiene adduct $R=R^5=H$; $R^1=R^2=Cl$;
$n=0$;
$a$=single bond;
$X=>CH_2$

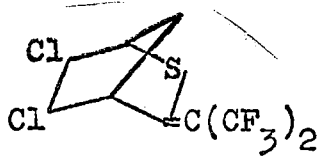

To 5.2 g. (0.02 mol) of the compound of Example 1 in 10 ml. of dichloromethane was added 4 g. (0.03 mol) of sulfuryl chloride in portions. Sulfur dioxide was evolved. After 30 min. the product was distilled to give 5.85 g. (88%) of isomers of 5,6-dichloro-3-[2,2,2-trifluoro - 1 - (trifluoromethyl)ethylidene] - 2 - thiabicyclo[2.2.1]heptane, B.P. 62° (0.2 mm.), $n_D^{26}$ 1.4824–1.4835. NMR shows that no —CH=CH— is present in the product.

*Analysis.*—Calcd. for $C_9H_6Cl_2F_6S$ (percent): C, 32.65; H, 1.83; Cl, 21.42; S, 9.68. Found (percent): C, 32.83; H, 1.85; Cl, 20.48; S, 9.60.

The product can also be made by using chlorine in place of sulfuryl chloride.

Example 10.—Dibromide of cyclopentadiene adduct

| (1) | (2) |
|---|---|
| $R=R^5=H$ | H |
| $R^1=Br$ | H |
| $R^2=H$ | Br |
| $n=0$ | 0 |
| $a$=single bond | Single bond |
| $X=\diagdown CHBr \diagup$ | $\diagdown CHBr \diagup$ | or (1)  (2)

To 15.6 g. (0.06 mol) of the compound of Example 1 in 15 ml. of dichloromethane was added 9.6 g. (0.06 mol) of bromine in 10 ml. of dichloromethane with cooling in ice. Evaporation of the solvent left 25.2 g. (100%) of 5 (or 6), 7-dibromo-3-[2,2,2-trifluoro-1-(trifluoromethyl)ethylidene]-2-thiabicyclo[2.2.1]heptane. After recrystallization from hexane it melted at 49–51°. NMR of the product, together with that of Example 11 indicates that bromine addition is accompanied by rearrangement to form a dibromide of the above structures.

*Analysis.*—Calcd. for $C_9H_6Br_2F_6S$ (percent): C, 25.74; H, 1.44; Br, 38.06. Found (percent): C, 25.94; H, 1.69; Br, 38.05.

When chlorine is used in place of bromine, some 7-chloro product is also obtained.

Example 11.—Bromo derivative of cyclopentadiene adduct $R=R^1=R^2=R^5=H$;
$n=0$; $a$=double bond;
$X=>CHBr$

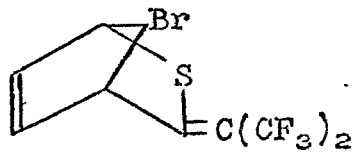

To 10 g. (0.089 mol) of potassium t-butoxide suspended in 150 ml. of ether was added in portions 35 g. of the dibromide of Example 10 in 35 ml. of ether with stirring and cooling in ice. The mixture was stirred for 2 hr. at 24° and then filtered and distilled. The cut distilling at 43–50° (0.1 mm.) was recrystallized from hexane to give 14.1 g. (50%) of 7-bromo-3-[2,2,2-trifluoro-1-(trifluoromethyl)ethylidene]-2 - thiabicyclohept-5-ene, M.P. 62–63°. NMR shows the presence of a CH=CH group.

*Analysis.*—Calcd. for $C_9H_5BrF_6S$ (percent): C, 31.88; H, 1.49; Br, 23.57. Found (percent): C, 31.98; H, 1.55; Br, 23.28.

Example 12.—Dihydro derivative of cyclopentadiene adduct $R=R^1=R^2=R^5=H$; $n=0$;
$a$=single bond; $X=>CH_2$

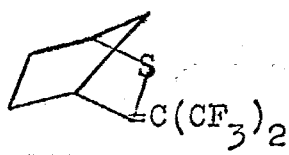

A solution of 30 g. of the compound of Example 1 in 125 ml. of ethanol containing 1.7 g. of 5% palladium on carbon and 0.3 g. of palladium black was subjected to hydrogenation at room temperature and 40 p.s.i. hydrogen pressure. After one hour the pressure drop had leveled off and the solution was filtered and distilled to give 25.4 g. (85%) of 3-[2,2,2-trifluoro-1-(trifluoromethyl)ethylidene]-2-thiabicyclo[2.2.1]heptane, B.P. 70° (5 mm.), $n_D^{25}$ 1.4442. NMR shows that the —CH=CH— group of the starting material was reduced.

*Analysis.*—Calcd. for $C_9H_8F_6S$ (percent): C, 41.23; H, 3.07; S, 12.23. Found (percent): C, 41.61; H, 3.10; S, 12.39.

Example 13.—Dihydro derivative of cyclooctatetraene adduct $R=R^1=R^2=R^5=H$; $n=0$;
$a$=double bond;

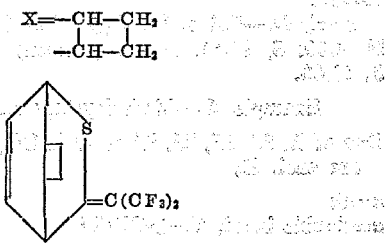

A solution of 25.6 g. of the compound of Example 3 in 100 ml. of alcohol containing 0.1 g. of platinum oxide was hydrogenated at room temperature and 40 p.s.i. for 1 hr. The solution was filtered and distilled in a simple still at 5 mm. The white crystals (25.2 g.) were recrystallized from methanol to give 23.4 g. (91%) of 4-[2,2,2-trifluoro-1-(trifluoromethyl)ethylidene]-3 - thiatricyclo[4.2.2.0$^{2,5}$] deca-9-ene in 4 crops, M.P. 46–46.5°. NMR indicates that the cyclobutene ring only was hydrogenated under these conditions.

*Analysis.*—Calcd. for $C_{12}H_{10}F_6S$ (percent): C, 48.00; H, 3.36; S, 10.68. Found (percent): C, 48.22; H, 3.16; S, 10.88.

More vigorous conditions are required to reduce the remaining cyclic double bond, for example, temperature of about 100° C. and a pressure of 500 p.s.i.

Example 14.—Pentamethyl-5-vinylcyclopentadiene adduct $R=R^1=R^2=R^5=CH_3$; $n=0$;
$a$=double bond;

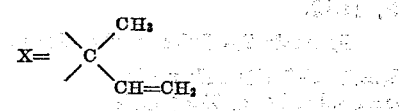

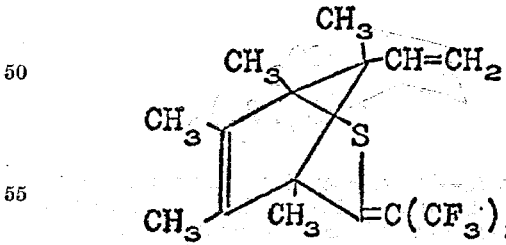

To 10.7 g. (0.066 mol) of pentamethyl-5-vinyl-cyclopentadiene [W. Shäfer and H. Hellman, Angew. Chem., Int. Ed. Engl., 6, 618 (1967)] was added 12.8 g. (0.066 mol) of bis(trifluoromethyl)thioketene with occasional cooling. Distillation gave 19.1 g. (81%) of two stereoisomers of 1,4,5,6,7-pentamethyl - 7 - vinyl-3-[2,2,2-trifluoro-1 - (trifluoromethyl)ethylidene] - 2 - thiabicyclo[2.2.1] hept-5-ene, B.P. 74° (0.5 mm.), $n_D^{25}$ 1.4799. Two isomers arise because the vinyl group can be directed toward or away from the sulfur atom. By adding methanol to the mixture, cooling in Dry Ice, and filtering, 8.5 g. of a solid isomer, M.P. 50–52°, was separated.

*Analysis.*—Calcd. for $C_{16}H_{18}F_6S$ (percent): C, 53.93; H, 5.09; S, 9.00. Found (percent): C, 53.77; H, 5.08; S, 9.12.

The liquid isomer is obtained by distilling the filtrate from the crystallization Example 15.—Spiro[4.4]nona-1,3-diene adduct $R=R^1=R^2=R^5=H$; $n=0$;
$a$=double bond;

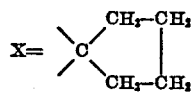

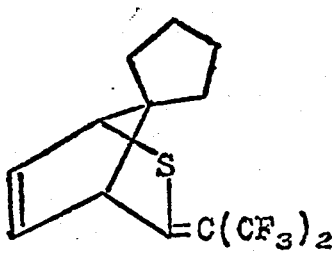

To 6.0 g. (0.05 mol) of spiro[4.4]nona-1,3-diene [E. O. Fischer and A. Werner, Chem. Ber., 93, 2075 (1960)] in 15 ml. of dichloromethane was added 9.70 g. (0.05 mol) of bis(trifluoromethyl)thioketene in 10 ml. of dichloromethane with cooling in ice. Distillation gave 10.2 g. (72%) of 3 - [2,2,2 - trifluoro-1-(trifluoromethyl)ethylidene]spiro - 2 - thiabicyclo[2.2.1]hept-5-ene-7,1¹-cyclopentane, B.P. 65° (0.2 mm.), $n_D^{25}$ 1.4685. ¹H NMR (neat) 1.47 (S, 8H, cyclopentane ring), 3.83 and 4.01 (M, 2H, bridgeheads), 6.02 and 6.50 (M, CH=CH).

*Analysis.*—Calcd. for $C_{13}H_{12}F_6S$ (percent): C, 49.68; H, 3.85; S, 10.20. Found (percent): C, 49.92; H, 3.68; S, 10.26.

By way of further illustration are the compounds of Column B which can be made by the reaction of bis(trifluoromethyl)thioketene with the compounds of Column A. In the case of unsymmetrical dienes in Column A, two isomers are produced as products, the ratio varying with the compound used. The mixture of isomers can be used as such, or if desired, separation can be effected by gas chromatography, or in favorable cases, by fractional distillation or crystallization.

| Column A | Column B |
|---|---|
| Cyclopentadiene | 3-[2,2,2-trifluoro-1-(trifluoromethyl)-ethylidene]-2-thiabicyclo[2.2.1]hept-5-ene. |
| 1-methyl | 1- and 4-methyl. |
| 5-methyl | 7-methyl. |
| 1,2-dimethyl | 1,6- and 4,5-dimethyl. |
| 5,5-dimethyl | 7,7-dimethyl. |
| 1,2,3-trimethyl | 1,5,6- and 4,5,6-trimethyl. |
| 1,2,3,4-tetramethyl | 1,4,5,6-tetramethyl. |
| 1,2,4,5,5-pentamethyl | 1,4,6,7,7-pentamethyl. |
| 1,2,3,4,5,5-hexamethyl | 1,4,5,6,7,7-hexamethyl. |
| 1,2,4-triethyl | 1,4,5- and 1,4,6-triethyl. |
| 1-ethyl-2-methyl | 1-ethyl-6-methyl and 4-ethyl-5-methyl. |
| 3,5-diisopropyl-1-methyl | 5,7-diisopropyl-1-methyl and 6,7-diisopropyl-4-methyl. |
| 2-t-butyl | 5- and 6-t-butyl. |
| 5-sec.-butyl | 7-sec.-butyl. |
| 5-cyclopentyl | 7-cyclopentyl. |
| 5-cyclohexyl | 7-cyclohexyl. |
| 1,3-dicyclohexyl | 1,5- and 4,6-dicyclohexyl. |
| 1,2,4-tricyclohexyl | 1,4,5- and 1,4,6-tricyclohexyl. |
| 2-chloro | 5- and 6-chloro. |
| 5,5-trimethylene (cyclic) | 7,7-trimethylene. |
| 5,5-tetramethylene | 7,7-tetramethylene. |
| 5,5-(3,3-diethylpentamethylene) (cyclic) | 7,7-(3,3-diethylpentamethylene). |
| 5,5-(1,2-cyclohexylene) (cyclic) | 7,7-(1,2-cyclohexylene). |
| 5,5-(1,1,2,2-tetramethyl)ethylene | 7,7-(1,1,2,2-tetramethyl)ethylene. |
| 5,5-(butylethylene) | 7,7-(butylethylene). |
| 5,5-ethylene-1-methyl | 7,7-ethylene-1-(and 4)methyl. |
| 5,5-dimethoxy | 7,7-dimethoxy. |
| 5,5-diethoxy | 7,7-diethoxy. |
| 5,5-trimethylenedioxy | 7,7-trimethylenedioxy. |
| 5,5-dihexyloxy | 7,7-dihexyloxy. |
| 1,3-cyclohexadiene | 3-[2,2,2-trifluoro-1-(trifluoromethyl)-ethylidene]-2-thiabicyclo[2.2.2]oct-5-ene. |
| 1-methyl | 1- and 4-methyl. |
| 1,5-dimethyl | 1, 8- and 4, 7-dimethyl. |
| 1,3,5,5-tetramethyl | 1,5,8,8- and 4,6,7,7-tetramethyl. |
| 1,2,3,4,5,6-hexamethyl | 1,4,5,6,7,8-hexamethyl. |
| 2-ethyl-5,5-dimethyl | 6-ethyl-8,8-dimethyl and 4-ethyl-7,7-dimethyl. |
| 5-isopropyl-2-methyl | 7-isopropyl-5-methyl and 8-isopropyl-6-methyl |
| 1-butyl-3-ethyl | 1-butyl-5-ethyl and 4-butyl-6-ethyl. |
| 1,3-dibutyl | 1, 5- and 4, 6-dibutyl. |
| 1,4-dimethoxy | 1,4-dimethoxy. |
| 2-chloro-3-ethoxy | 5-chloro-6-ethoxy and 6-chloro-5-ethoxy. |
| 2-chloro | 5- and 6-chloro. |

Similarly substituted cyclooctatetraenes may be employed to prepare homologues and analogues of the product of Example 3.

Halogenated compounds can be produced by starting with a halogenated diene or by adding halogen to a double bond in the product (Examples 10 and 11) to form a

group. If hydrogen is present on one of the carbon atoms, the compound may be treated with a base such as potassium t-butoxide, potassium hydroxide, or sodium ethoxide, to eliminate HX and form the group

Halogen may be again added to this group to form

If a hydrogen atom is present on the carbon adjacent to the $CX_2$ group, HX may be eliminated again to form

Fluorine is conveniently introduced by adding IF to form

Elimination of HI from this with alkali gives the group

For example:

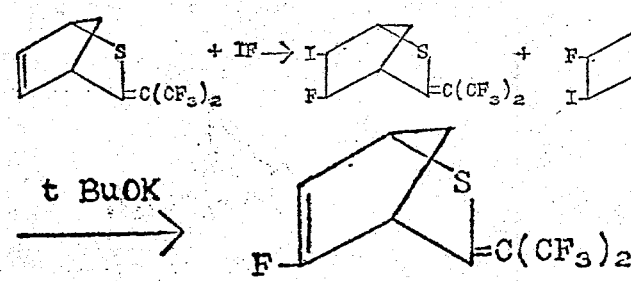

The oxidation of a typical product (Example 1) to the sulfoxide and sulfone (Examples 7 and 8) has been illustrated with the use of hydrogen peroxide and m-chloroperbenzoic acid, but other oxidizing agents such as peracetic acid, perbenzoic acid, perphthalic acid, permaleic acid, dichromates, permanganates, and metaperiodates can be used for one or more of these steps.

The hydrogenation of two compounds has been illustrated with palladium and platinum as catalysts but other catalysts, such as ruthenium, rhodium, Raney nickel, and copper chromite may be used, as well as chemical reduction, e.g., with a diimide.

The anti-arthritic properties of these compounds are determined by a test that is based on inhibition of the development of arthritic processes induced in warm-blooded animals, e.g. rats, by the subcutaneous injection of adjuvant (mycobacterial cells suspended in mineral oil). Adjuvant-induced arthritis in rats was first described by Pearson, C. M., Proc. Soc. Exp. Biol. and Med., 91, 95 (1956). The established anti-arthritic drugs are active in this test. The method employed follows:

Male, CFE rats weighing 150–200 grams and housed in pairs in conventional suspended stainless steel cages were used in groups of 12–14 per drug dose level. The animals received food in the form of Wayne Lab Blocks and water ad libitum during the entire experiment. The rats were injected subcutaneously with 0.1 ml. of a suspension of *Mycobacterium butyricum* (Difco heat-killed, lyophilized cells) in mineral oil (5 mg./ml.) into the plantar area of the right hind paw. Mineral oil injected rats served as non-arthritic controls.

Drug treatment was begun immediately after the adjuvant injection and was continued for 14 days. Drugs were intubated once daily in 1 ml. per 100 grams of body weight of PVA-Acacia medium (polyvinyl alcohol 1%, gum acacia 5% and methylparaben 0.5%). Twenty-four hours after the last dose the volume of the left hind paw (uninjected) was measured by mercury displacement plethysmography. The animals were then lightly anesthetized with sodium pentobarbital and a 2 ml. blood sample was obtained by cardiac puncture. The total white blood cell count (Coulter Counter, Coulter Electronics, Inc., Hialeah, Fla.), the erythrocyte sedimentation rate (Wintrobe microhematocrit tube method) and the differential leucocyte count were determined.

The paw volume measurement is recorded as the meter reading from a transducer-indicator that expresses proportionately the effect of mercury displacement on a suitably oriented strain gauge. The system is calibrated with a metal rod of known volume. The conversion of the mean meter reading to ml. is obtained from a standard curve.

Increase in the paw volume of the uninjected hind paw is proportional to the development of arthritis in adjuvant injected rats. Inhibition of paw volume increase in drug treated rats is indicative of anti-arthritic activity.

The compounds were tested at 3 or more dose levels. Dose-response curves were constructed for 2% inhibition of the treated group mean paw volume increases as compared to control group mean paw volume increase. The dose (mg./kg.) required to produce 60% inhibition of the mean paw volume increase (ED60) was determined from the dose-response curve.

The following table shows the activity of compounds of various preceding examples and of several anti-arthritic compounds currently in use.

TABLE

| Compound of example: | Mg./kg. to give 60% inhibition |
|---|---|
| 1 | 6 |
| 2 | 12 |
| 3 | 9 |
| 4 | 4 |
| 5 | 65 |
| 6 | 24 |
| 7 | 56 |
| 8 | 30 |
| 10 | 32 |
| 12 | 16 |
| 13 | 25 |
| Aspirin | 70 |
| Cyclophosphamide | 1 |
| Azathioprine | 5 |
| Hydrocortisone | 1 |
| Indomethacin | 3 |
| Phenylbutazone | 55 |

The compound of Example 1 has also been found to suppress cellular immune response in animals without affecting humoral immune responses.

It will be understood that the compounds of this invention can be administered to combat inflammation by any means that effectively delivers an effective amount of the compound to the site of the inflammation. In some applications this means that a parenteral route of administration will be used. For example, an effective amount of a compound of this invention can be injected directly into the affected area. In other instances, subcutaneous or intramuscular application may be preferred. Alternatively or concurrently, the compounds of this invention can also be administered orally or applied topically. However, in most instances, oral administration is the preferred route.

It will be understood that the dosage administered will be dependent on the age, health and weight of the recipient; the severity of the arthritic or other condition being treated; the kind of concurrent treatment and the nature of the effect desired. Generally, a daily dosage of active ingredient compound will be from about 0.05 to 50 milligrams per kilogram of body weight per day, although lower or higher amounts can be used. A preferred range is from about 0.1 to about 10 milligrams per kilogram per day in one or more doses.

As previously discussed, the compounds of this invention can be administered by injection or taken orally and it therefore should be understood that they can be employed as useful compositions in dosage forms such as tablets, capsules, powder packets, liquid solutions, suspensions and elixirs for oral administration; liquid solutions for parenteral use, and in certain cases, suspensions for parenteral use. In such compositions, the active ingredient will ordinarily be present in an amount ranging from about 0.01% up to about 90% by weight based on the total weight of the composition.

Besides the active ingredient of this invention the composition will contain a solid or liquid non-toxic pharmaceutical carrier for the active ingredient.

In one embodiment of a pharmaceutical composition of this invention, the solid carrier is a capsule which can be of the ordinary gelatin type. The capsule will comprise from about 0.1% to 75% by weight of a compound of this invention and about 99.9% to 25% of a carrier. In another embodiment, the active ingredient is tableted with or without adjuvants. In yet another embodiment, the active ingredient is put into powder packets and employed. These capsules, tablets, and powders will generally constitute from about 0.5% to about 95% and preferably from 1% to 50% by weight of active ingredient. These dosage forms preferably contain from about 10 to about 500 milligrams of active ingredient, with from about 25 milligrams to about 250 milligrams most preferred.

The pharmaceutical carrier can be a sterile liquid such as water and oils, including those of petroleum, animal, vegetable or synthetic origin, for example peanut oil, soybean oil, mineral oil, sesame oil, and the like. Sterile injectable solutions such as saline will ordinarily contain from about 0.5% to 25%, and preferably about 1% to 5% by weight of the active ingredient.

As mentioned above, oral administration can be in a suitable suspension or elixir in which the active ingredient ordinarily will constitute from about 0.5 to 15% and preferably about 1 to 10% by weight. The pharmaceutical carrier in such composition can be an aqueous vehicle such as a pharmaceutical mucilage.

Suitable pharmaceutical carriers are described in "Remington's Pharmaceutical Sciences" by E. W. Martin, a well-known reference text in this field.

The following further examples illustrate specific pharmaceutical compositions for administration to a warm-blooded animal.

Example 16

The compound of Example 3 is formulated conveniently in 10, 25, 50, 100 and 250 milligram amounts in standard two-piece hard gelatin capsules with a diluent such as starch, mannitol or lactose, for oral administration. In pharmacologic applications it is administered in these dosage forms at dosage levels in the range of 0.5 to 50 milligrams per kg. of body weight, as described above.

Example 17

The compound of Example 7 can be formulated for oral administration with suitable tableting adjuvants using a conventional tableting machine with the active ingredient constituting 1 to 50% by weight of the tablet. Other ingredients include gelatin, magnesium stearate, and starch or mannitol as described in the foregoing Martin reference.

Formulations of the type illustrated by Example 17 are also made with any of the active solid compounds of this invention.

Example 18

The compound of Example 1 can be formulated for oral administration in a soft gelatin capsule. Each capsule contains the following ingredients:

| | Mg. |
|---|---|
| (1) Active ingredient | 25.0 |
| (2) Soybean oil, refined | 600.0 |
| (3) Gelatin | 136.5 |
| (4) Glycerin | 66.5 |
| (5) Water | 13.51 |
| (6) Methylparaben | 0.56 |
| (7) Propylparaben | 0.14 |
| (8) FD&C Yellow No. 5 | 0.193 |
| (9) FD&C Yellow No. 6 | 0.038 |
| (10) Titanium dioxide | 2.929 |

The active ingredient is dissolved in soybean oil at 140° C., the solution is cooled and injected by means of a positive displacement pump into the gelatin (which contains the other ingredients) to form the capsule. The capsules are washed in petroleum ether and dried.

The concentration of active ingredient in oil can be varied to provide other dosage strengths. Other pharmaceutically acceptable oils can be used such as: peanut oil, cottonseed oil, corn oil and the like.

Example 19

The compound of Example 1 can be formulated for intramuscular injection by dissolving the compound in corn oil or sesame oil in concentrations of 0.1% to 1% (wt./vol.). In addition, 2 to 3% by volume of benzyl alcohol, N.F. may be included in the solution. The solution is clarified by filtration, placed in grass ampoules, sealed, and then sterilized by heating.

Example 20

A flavored elixir containing 50 mg. of the compound of Example 1 in every 5 ml. can be prepared by dissolving the compound in a flavored solution of sorbitol containing up to 50% of ethyl alcohol U.S.P. so that the final concentration is 1% weight/volume.

The disclosure herein should not be taken as a recommendation to use the disclosed invention in any way without full compliance with U.S. Food and Drug Laws and other laws and governmental regulations which may be applicable.

The embodiments of the invention in which an exclusive property or privilege is claimed are defined as follows:

1. A compound having the formula

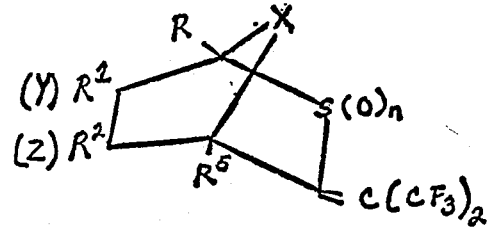

wherein $n = 0$, 1 or 2;

Y and Z each represent H or together represent a carbon-carbon bond;

R and $R^5$, alike or different, are H, alkyl or alkoxy of up to 4 carbon atoms, or cycloalkyl of up to 6 carbon atoms;

$R^1$ and $R^2$, alike or different, are H, alkyl of up to 4 carbon atoms, cycloalkyl of up to 6 carbon atoms or halogen;

X is a bridging means consisting of a divalent radical selected from the group consisting of

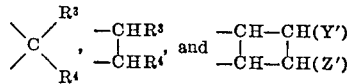

wherein $R^3$ and $R^4$, alike or different, are H, alkyl or alkenyl of up to 4 carbon atoms, cycloalkyl of 5–6 carbon atoms, alkoxy of up to 6 carbon atoms, Cl or Br, with the proviso that only one of $R^3$ and $R^4$ is Cl or Br; and when joined together, alkylene of 2–6 chain carbon atoms; or a trimethylenedioxy; and Y' and Z' each represent H or together represent a carbon-carbon bond.

2. The compound of claim 1 which is 3-[2,2,2-trifluoro-1-(trifluoromethyl)ethylidene]-2 - thiabicyclo[2.2.1]hept-5-ene.

3. The compound of claim 1 which is 3-[2,2,2-trifluoro-1-(trifluoromethyl)ethylidene] - 2 - thiabicyclo[2.2.2]oct-5-ene.

4. The compound of claim 1 which is 4-[2,2,2-trifluoro-1-(trifluoromethyl)ethylidene] - 3 - thiatricyclo[4.2.2.0$^{2,5}$]deca-7,9-diene.

5. The compound of claim 1 which is 3-[2,2,2-trifluoro-1-(trifluoromethyl)ethylidene]spiro-2 - thiabicyclo[2.2.1]hept-5-ene-7,1'-cyclopropane.

6. A compound of claim 1 which is methyl-3-[2,2,2-trifluoro - 1 - (trifluoromethyl)ethylidene]-2-thiabicyclo[2.2.1]hept-5-ene.

7. The compound of claim 1 which is 3-[2,2,2-trifluoro-1-(trifluoromethyl)ethylidene]-2 - thiabicyclo[2.2.1]hept-5-ene-2-oxide.

8. The compound of claim 1 which is selected from the group consisting of 5,7- and 6,7-dibromo-3-[2,2,2-trifluoro - 1 - (trifluoromethyl)ethylidene] - 2-thiabicyclo[2.2.1]heptane.

9. The compound of claim 1 which is 3-[2,2,2-trifluoro-1-(trifluoromethyl)ethylidene] - 2 - thiabicyclo[2.2.1]heptane.

10. The compound of claim 1 which is 4-[2,2,2-trifluoro - 1 - (trifluoromethyl)ethylidene] - 3 - thiatricyclo[4.2.2.0$^{2,5}$]deca-9-ene.

References Cited
UNITED STATES PATENTS
3,406,184  10/1968  Raasch _____ 260—327

HENRY R. JILES, Primary Examiner
C. M. S. JAISLE, Assistant Examiner

U.S. Cl. X.R.
260—332.1, 332.3 P, 332.5; 424—275

UNITED STATES PATENT OFFICE
CERTIFICATE OF CORRECTION

Patent No. 3,752,827  Dated 11/13/73

Inventor(s) Maynard Stanley Raasch

It is certified that error appears in the above-identified patent and that said Letters Patent are hereby corrected as shown below:

| Column | Line | Change |
|---|---|---|
| 3 | 14 | "a" to --Y and Z-- |
| 3 | 43 | "   "    " |
| 4 | 3 | "   "    " |
| 4 | 35 | "   "    " |
| 4 | 69 | "   "    " |
| 5 | 16 | "   "    " |
| 5 | 47 | "   "    " |
| 6 | 5 | "   "    " |
| 7 | 20 | "   "    " |
| 8 | 4 | "   "    " |
| 8 | 40 | "   "    " |
| 9 | 6 | "   "    " |
| 6 | 65 | "a" to --Y and Z-- |
| 6 | 65 | "single bond", each occurrence, to --H-- |
| 7 | 50 | "a=single bond" to --Y and Z each=H-- |
| 4 | 18 | "4" to --7-- |
| 4 | 19 | "3" to --8-- |
| 4 | 20 | "7, 9" to --3, 9-- |
| 8 | 25 | "of 4-" to --of 7- -- |
| 8 | 26 | "3" to --8-- |
| 15 | 12 | "is 4-" to -- is 7- -- |
| 15 | 13 | "3" to --8-- |
| 15 | 14 | "7" to --3-- |
| 16 | 8 | "4" to --7-- |
| 16 | 9 | "3" to --8-- |
| 16 | 2 | cancel "the group consisting of 5, 7 and" |

Signed and sealed this 25th day of June 1974.

(SEAL)
Attest:

EDWARD M. FLETCHER, JR.
Attesting Officer

C. MARSHALL DANN
Commissioner of Patents